United States Patent [19]

Redmond

[11] 4,238,716

[45] Dec. 9, 1980

[54] MINIATURE VEHICLE DISPENSER SPIN-UP SPEED CONTROL SYSTEM

[75] Inventor: William G. Redmond, Dallas, Tex.

[73] Assignee: The United States of America as represented by the Secretary of the Air Force, Washington, D.C.

[21] Appl. No.: 946,288

[22] Filed: Sep. 27, 1978

[51] Int. Cl.³ .............................................. H02P 5/16
[52] U.S. Cl. ..................................... 318/314; 318/318
[58] Field of Search ............... 318/314, 318, 341, 326, 318/327, 380

[56] References Cited

U.S. PATENT DOCUMENTS

| | | | |
|---|---|---|---|
| 3,188,547 | 6/1965 | Zelina | 318/380 |
| 3,638,089 | 1/1972 | Gabor | 318/318 |
| 4,041,362 | 8/1977 | Ichiyangi | 318/318 |

Primary Examiner—David Smith, Jr.
Attorney, Agent, or Firm—Joseph E. Rusz; Henry S. Miller

[57] ABSTRACT

A precision motor speed control system where a reference generator produces pulses for each revolution of a dispenser shaft, the time between pulses is measured and compared to a preselected standard, a time greater than standard will generate a pulse causing a transistor circuit to apply an accelerating voltage to the motor, a time less than the standard will generate a pulse causing a transistor circuit to apply a decelerating voltage to the motor.

1 Claim, 1 Drawing Figure

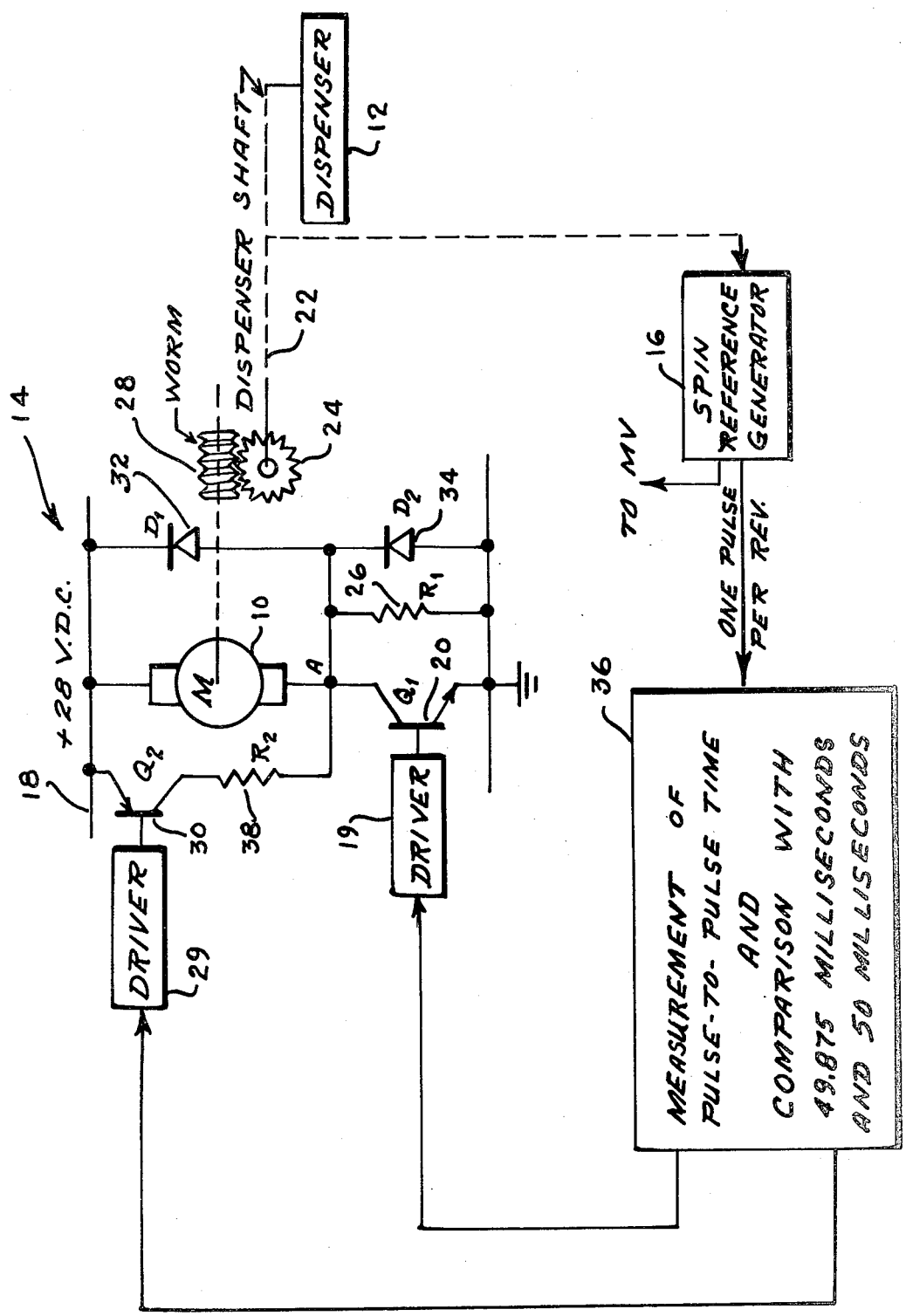

MINIATURE VEHICLE DISPENSER SPIN-UP SPEED CONTROL SYSTEM

BACKGROUND OF THE INVENTION

This invention relates generally to a dispensing system for miniature vehicles and more particularly to a dispenser spin-up speed control system.

In dispensing miniature vehicles of various types in space or in the atmosphere, where some form of guidance is required, it is necessary to provide some spin effect to the vehicle in order to insure proper operation of guidance components. Various systems have been studied for providing the spin-up for the dispensing system and two have been found with the potential to accomplish the task.

An electric motor only drive system has been proposed but fails, in that the torque required for the motor to accelerate a reasonably sized dispenser to 20 revolutions per second in 10 seconds, for example, would require a large motor, and hence to cause a reaction torque on the upper-stage vehicle (in a space application) necessating a two-stage nitrogen reaction control system instead of the single stage system described in the invention.

A more acceptable system, for providing spin is a system where the dispenser is run-up and controlled by two driving systems. A toroidal high pressure nitrogen tank and two peripherally located nozzles provide torque to accelerate the dispenser up to speed, with approximately 6.5% tolerance, and a small electric motor which brings the speed to 20 revolutions per second, with in 10 seconds from spin-up start. The electric motor holds the speed of the dispenser to ±0.1 revolutions per second.

Each of the peripherally located nozzles is opened by dualized pyrotechnic devices. The nitrogen then "blows down" to depletion, accelerating the dispenser to the near 20 revolutions per second.

This double system (gas-electric) provides substantially the same degree of reliability as a single (electric motor only) system with a two-stage reaction control system in the upper stage. Further, considering the weight variably between the heavier single system and the lighter dual system the dual system is a substantially superior system to the single system.

SUMMARY OF THE INVENTION

The invention is directed to a precision motor speed control circuit used in combination with a gas reaction system to accelerate a load dispenser. According to the invention, the circuit relies on a spin generator that produces electrical pulses for each revolution that the load dispenser is spun. The time between succeeding pulses is measured, and if greater than a first predetermined time, the circuit causes a driver to turn on a first transistor which applies an accelerating voltage to the motor. If the time between pulses is less than the first predetermined time, the first transistor is turned off; and if the time between pulses is less than a second predetermined time, another driver turns on a second transistor which applies a decelerating voltage to the motor. As the motor decelerates, the time between pulses increases and the second transistor is turned off. Protective diodes are added to the circuit to prevent destructive inductive voltage spikes from affecting the circuit's operation. The speed control circuit is able to provide precise motor speed control with no time lag and without the need for a continuous tachometer speed signal.

It is therefore, an object of the invention to provide a new and improved miniature vehicle dispenser spin-up speed control system.

It is another object of the invention to provide a new and improved speed control system which functions without a continuous input or feedback speed signal.

It is a further object of the invention to provide a new and improved speed control system that is more precise than any similar known system.

It is still another object of the invention to provide a new and improved speed control system that is simple in design and easily maintained.

It is still a further object of the invention to provide a new and improved dispenser spin-up control system that is light in weight and highly reliable.

It is another object of the invention to provide a new and improved miniature vehicle dispenser spin-up speed control system that avoids any time lag between speed sensing and correction. It is another object of the invention to provide a new and improved speed control system which is economical to produce and utilize conventional, currently available components that lend themselves to standard mass production manufacturing techniques.

These and other advantages, features, and objects of the invention will become more apparent from the following description taken in connection with the illustrative embodiment in the accompanying drawing.

DESCRIPTION OF THE DRAWING

The FIGURE is a combination block diagram-schematic of the motor speed controller.

DESCRIPTION OF THE PREFERRED EMBODIMENT

Referring now to the FIGURE, whenever it is necessary to control speed precisely, it is necessary to have good speed information. A continuous tachometer signal is best, because then when speed is incorrect, corrective action can be taken with no time lag. Lacking a continuous tachometer signal, then one with minimum interruptions, such as a 400-cycles/sec carrier signal is desired. Such a carrier can be full-wave demodulated and filtered and still have a bandwidth of the order of 100 cycles/sec.

The requirement for speed control on a miniature vehicle dispenser is 20±0.1 rev/sec., or 0.5% variation. But without adding a tachometer, the only speed indication is a pulse once each revolution of the dispenser with respect to the upper stage, from a spin reference generator, at a frequency approximately 20 cycles/sec. To work with this low-frequency signal in the frequency domain would be a problem; if the signal were demodulated and filtered, the maximum bandwidth would be only about 5 cycles/sec. Alternatively if the number of pulses in a certain time period were counted as an indication of speed, this would cause considerable delay, since only 1 pulse per revolution occurs.

The solution is to use the time from each pulse to the next pulse, rather than the number of pulses in a given time. Although no signal to indicate speed exists during the period of 1 revolution, the speed vs. time can be closely predicted and controlled by controlling the acceleration or deceleration during each revolution.

The FIGURE shows a combination block diagram-schematic of the motor speed controller. For the motor 10 to be able to decelerate the dispenser 12 when a cold-gas spin-up system spins it faster than 20 rev/sec. and able to accelerate it when the gas does not get it up to 20 rev/sec (to allow greater tolerance on the gas system), a double-acting circuit, shown generally at 14, is used. As long as the pulse-to-pulse time (period) of the pulses from the spin reference generator 16 is greater than 50 milliseconds (speed less than 20 RPS), 28 V. line voltage 18 is applied to motor 10 by means of transistor 20 being turned ON by driver 19. This causes motor 10 to deliver torque according to its speed-to-torque curve, referred to the dispenser shaft 22 with a gear ratio (24) of 5:1. When the period of the pulse becomes less than 50 millisecond (speed over 20 RPS) transistor 20 is cut OFF. If the gas system is not putting out torque greater than the friction on the dispenser shaft 22, the dispenser and motor will begin to slow down. Resistor 26 is sized to provide enough motor current to make the motor continue to overcome its own friction, so worm-gear drive 28 does not move through its own backlash. When the period again becomes greater than 50 milliseconds (speed less than 20 RPS), transistor 20 again applies line voltage to speed up motor 10.

If the gas system torque is greater than the dispenser shaft (20) friction when the speed reaches 20 RPS and transistor 20 cuts OFF, dispenser 12 will continue to be accelerated. When the period decreases to 49.875 milliseconds (20.05 RPS), transistor 30 is turned ON, (by driver 29) which flows "reverse" current (produced by the motor acting as a generator) and produces torque in the direction to decelerate the dispenser. When the speed drops below 20.05 RPS, transistor 30 cuts OFF.

Diodes 32, 34 prevent destructive inductive voltage spikes; diode 32 prevents point A from going more positive than the line voltage and diode 34 prevents point A from going more negative than ground. Without diode 32 point A would go about 300 volts positive when transistor 20 cuts OFF; without diode 34, point A would go about 300 volts negative when transistor 30 cuts OFF. The diodes do keep motor current flowing in the existing direction about 1 millisecond after each transistor cuts OFF, which produces a time lag, but such a small time lag is harmless in this system.

Measurement of pulse to pulse time (36) may be performed with either conventional digital or analog techniques. In utilizing digital techniques, the number of cycles in a high frequency clock are counted between pulses from spin reference generator 16. Assume a clock frequency of 1 megahertz; each cycle lasts 1 $\mu$S, and so a counting error of several cycles is acceptable (in the system discussion above, an uncertainty of 7.5 $\mu$S per system period was assumed).

If there are fewer than 49.875 milliseconds between pulses, then fewer than 49,875 cycles will be counted, and transistor 30 will be turned ON for the next period, to decelerate the dispenser, and transistor 20 will be cut OFF.

If there are more than 50,000 cycles between pulses, transistor 30 will be cut OFF.

In the analog technique, at a pulse from the spin reference generator 16, a precision integrator begins to produce a voltage increasing with time. Two reference voltages, equal to the values the integrator output reaches in 49.875 milliseconds and in 50 milliseconds, are compared with the integration output at the time the next pulse occurs.

If the next pulse occurs in less than 49.875 milliseconds, the integrator output will not be up to either reference voltage, and the comparators will say so, and the circuit will turn ON transistor 30 for the next period, to decelerate the dispenser, and will cut OFF transistor 20.

If the next pulse occurs in more than 49.875 milliseconds, but less than 50 milliseconds, the integrator output will be greater than the lower reference voltage but less than the higher reference voltage, and the comparators will say so, and transistors 30 and 20 will both be cut OFF for the next period.

If the next pulse occurs in more than 50 milliseconds, transistor 30 will be cut OFF and transistor 20 turned ON. Coincident with making the comparison at each pulse, the integrator starts over.

By way of specific example, to control spin-up of the dispenser from an underspeed condition (speed under 20 revolutions per second, the period will be more than 50 milliseconds and transistor 20 will keep the motor powered, which will accelerate the dispenser. As the speed nears 20 RPS, the motor will apply;

54.29 in-oz×(worm drive efficiency=0.70)=0.38 in-oz to the dispenser shaft. Subtracting 20 in-oz friction at dispenser shaft leaves 18 in-oz to accelerate the dispenser:

$$\ddot{\theta} = \frac{T}{I} = \frac{18 \text{ in-oz}}{.18 \text{ Slug-ft}^2 \times 12 \times 16} = .521 \frac{\text{rad}}{\text{sec}^2} \text{ or } .0829 \frac{\text{rev}}{\text{sec}^2}.$$

This is the slope with which the speed vs time curve will go through 20 RPS, and will increase the speed 0.004 RPS in 50 millisec.

In the event there is a speed overshoot the period must become less than 50 milliseconds. For the period to become less than 50 milliseconds, the average speed through that period must be greater than 20 RPS. Thus, the speed at the pulse where Q1 (transistor 20) cuts the motor off must be more than $$20 + \frac{.0829 \text{ RPS}^2 \times .05}{2} = 20.002 \text{ RPS}$$

If a period is exactly 50 milliseconds, and transistor 20 does not cut OFF due to electronic tolerance, then the dispenser will accelerate to 20.002+0.004 RPS in the next period, and this period will be 49.990 milliseconds, or 10 microseconds less than 50 milliseconds. The period-to-period variation of the spin reference generator is ±2.5 $\mu$S maximum. Arbitrarily allowing another 7.5 $\mu$S variation through the sensing electronics (in addition to variations in the basic 50 millisecond time base) transistor 20 may stay on another period, and the speed reach 20.01 RPS. Then transistor 20 will be cut OFF, and friction will begin to slow the dispenser, with $$\ddot{\theta} = \frac{20 \text{ in-oz}}{.18 \times 12 \times 16} = .579 \frac{\text{rad}}{\text{sec}^2} \text{ or } .092 \frac{\text{rev}}{\text{sec}^2}$$

deceleration, with friction of 20 in-oz. With this deceleration, the dispenser will take $$\frac{.01 \text{ RPS}}{.092 \text{ RPS/sec}} = .109 \text{ sec, or } 2.17 \text{ 50 MS periods}$$

to slow to 20 RPS; and in three 50 MS periods will be at 20.01−0.92×0.150=19.9962 RPS, and this period will be 50,004 μS. Since this is only 4 μS from the ideal 50 MS, transistor 20 may stay OFF another period, until the speed drops to 19.9916 RPS. Then transistor 20 will be turned ON, and the dispenser will again accelerate at 0.0829 RPS$^2$ as discussed earlier, up to about 20.01 RPS, and then again decelerate, and so on.

As the speed accelerates through 20 RPS, transistor 20 will cut OFF power to motor 10, and it will then be an electrically unloaded generator. When speed reaches $$\frac{1}{.049875} = 20.05 \ RPS,$$

transistor 30 is turned on and flows current which produces torque in direction opposite to motor rotation, opposite to gas system torque. (Worm 28 will then move through its backlash). This will make the peak overspeed less than the gas system alone would have attained. In less than 3 seconds from start, the gas system will be essentially spent, and then the motor will produce the greatest deceleration. Around this speed (6000 RPM at motor), the motor back EMF is $$(2.3 \ v/1000 \ RPM) \times 6000 \ RPM = 13.8 \ volts$$

Allowing for 1 volt drop across transistor 30 and with resistor 38 ($R_2$)=0, this back EMF will produce armature current $$I_a = \frac{13.8 - 1}{2.5r} = 5.12 \ amps,$$

which gives $$3.1 \frac{in\text{-}oz}{amp} \times 5.12 \ amp \times 5 = 79.36 \ in\text{-}oz$$

decelerating torque referred to dispenser shaft if no friction. For a calculated efficiency of the worm being back-driven as 70% and adding dispenser friction gives $$79.36 \div 0.7 + 20 = 133.4 \ in\text{-}oz,$$

which will decelerate the dispenser at $$\ddot{\theta} = \frac{133.4}{.18 \times 12 \times 16} = 3.86 \frac{rad}{sec^2} \ or \ .615 \frac{rev}{sec^2}.$$

Allowing ±6.85% tolerance on the gas system total impulse (13.16% total spread), and requiring it to get the dispenser up to at least 19.42 RPS, then on the high side of tolerance, the gas would get the speed (in ≈ 3 seconds) up to $$2 \times 0.0658 \times 20 + 19.42 = 22.05 \ RPS.$$

With deceleration of 0.615 rev/sec$^2$, this 2.05 RPS excess is removed in $$\frac{2.05 \ RPS}{.615 \ RPS/sec} = 3.33 \ seconds.$$

Since this is less than the 7 seconds allowed, the tolerance on the gas system can be increased beyond ±6.58% and a higher speed due to gas be allowed, if the upper stage reaction control system can handle the greater 133.4 in-oz (8.34 in-lb) torque and an impulse of $$133.4 \ in \ oz \times 7 \ sec = 933.8 \ in\text{-}oz \ sec$$

on the dispenser and hence on the upper stage. If the upper stage cannot take this, then resistor 38 can be sized to reduce the torque and impulse to values the upper stage can take, with less-broad tolerance on the gas system.

Regarding motor speed control: At this (the high) value of deceleration of 0.615 rev/sec$^2$, the dispenser will slow $$0.615 \times 0.05 = 0.031 \ RPS$$

in 50 millisec.; hence $$20.05 - \left(\frac{.031}{2} + .031\right) = 20.05 - .0465 = 20.0035 \ RPS$$

is the slowest that the dispenser can get and keep the period less than 49.875 milliseconds. Transistor 30 will stay ON until the period gets up to 49.875 milliseconds (speed down to 20.05 RPS), plus possibly 10 μsec electronic tolerance, at which time transistor 30 cuts OFF. Then the dispenser will slow further with the low friction-only deceleration of 0.092 rev/sec$^2$ until the period increases to 50 milliseconds.

Although the invention has been described with reference to a particular embodiment, it will be understood to those skilled in the art that the invention is capable of a variety of alternative embodiments within the spirit and scope of the appended claims.

I claim:

1. A miniature vehicle dispenser spin-up control system, for use in combination with a gas reaction acceleration system, including an electric motor having a shaft, connected through a gear system, to a dispenser and further including means for generating an electronic pulse for each revolution of the motor shaft and means for measuring the time interval between pulses, comparing it with a standard time interval and producing a first output when the time interval is more than the standard and a second output when the time interval is less than the standard, the improvement comprising: a first transistor circuit connecting a line voltage with the motor and controlled by said first output whereby a signal will cause the motor shaft to accelerate; a resistor connected in parallel with the transistor, providing a current to allow the motor to overcome its' inherent friction and a diode connected in parallel with the first transistor and resistor for preventing induced voltages; a second transistor circuit connecting a line voltage, with the motor and controlled by the second output, a limiting resistor connected in series between the transistor and the motor whereby a back emf is created causing the motor shaft to decelerate, and a diode connected in parallel with the transistor reactor for preventing induced voltages.

* * * * *